United States Patent
Savvides et al.

(10) Patent No.: US 8,411,910 B2
(45) Date of Patent: Apr. 2, 2013

(54) COMPUTATIONALLY EFFICIENT FEATURE EXTRACTION AND MATCHING IRIS RECOGNITION

(75) Inventors: Marios Savvides, Wexford, PA (US); Khalid Harun, Pittsburgh, PA (US); Vijayakumar Bhagavatula, Pittsburgh, PA (US); Sung Won Park, Seoul (KR); Yunghui Li, Tapei (TW)

(73) Assignee: Biometricore, Inc., Pittsburgh, PA (US)

( * ) Notice: Subject to any disclaimer, the term of this patent is extended or adjusted under 35 U.S.C. 154(b) by 896 days.

(21) Appl. No.: 12/426,210

(22) Filed: Apr. 17, 2009

(65) Prior Publication Data

US 2010/0014718 A1  Jan. 21, 2010

Related U.S. Application Data

(60) Provisional application No. 61/045,958, filed on Apr. 17, 2008, provisional application No. 61/073,735, filed on Jun. 18, 2008, provisional application No. 61/073,734, filed on Jun. 18, 2008, provisional application No. 61/045,962, filed on Apr. 17, 2008.

(51) Int. Cl.
*G06K 9/62* (2006.01)

(52) U.S. Cl. ........................................................ 382/117

(58) Field of Classification Search ........................ None
See application file for complete search history.

(56) References Cited

U.S. PATENT DOCUMENTS

| 5,291,560 A | * | 3/1994 | Daugman | 382/117 |
| 2007/0274570 A1 | * | 11/2007 | Hamza | 382/117 |

* cited by examiner

*Primary Examiner* — Brian P Werner
(74) *Attorney, Agent, or Firm* — Kenneth P. Waszkiewicz, Attorney at Law

(57) ABSTRACT

A method and system for uniquely identifying a subject based on an iris image. After obtaining the iris image, the method produces a filtered iris image by applying filters to the iris image to enhance discriminative features of the iris image. The method analyzes an intensity value for pixels in the filtered iris image to produce an iris code that uniquely identifies the subject. The method also creates a segmented iris image by detecting an inner and outer boundary for an iris region in the iris image, and remapping pixels in the iris region, represented in a Cartesian coordinate system, to pixels in the segmented iris image, represented in a log-polar coordinate system, by employing a logarithm representation process. The method also creates a one-dimensional iris string from the iris image by unfolding the iris region by employing a spiral sampling method to obtain sample pixels in the iris region, wherein the sample pixels are the one-dimensional iris string.

14 Claims, 10 Drawing Sheets

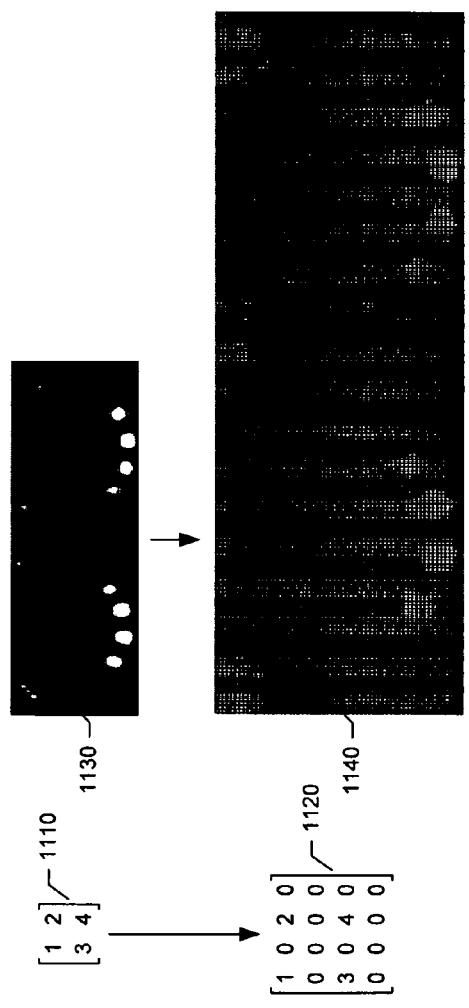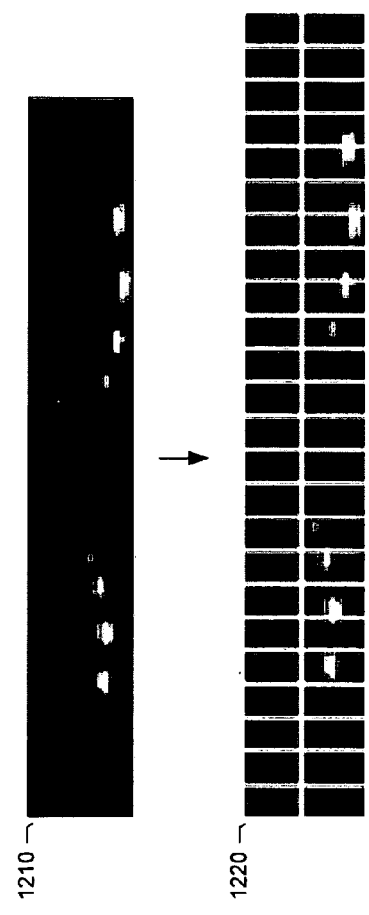
*Figure 11*
*Figure 12*

COMPUTATIONALLY EFFICIENT FEATURE EXTRACTION AND MATCHING IRIS RECOGNITION

CROSS-REFERENCE TO A RELATED APPLICATION

This application for letters patent relates to and claims the benefit of U.S. Provisional Patent Application Ser. No. 61/045,958, titled "Computationally Efficient Feature Extraction and Matching Iris Recognition", and filed on Apr. 17, 2008; the disclosure of which this application hereby incorporates by reference.

This application for letters patent also relates to and claims the benefit of U.S. Provisional Patent Application Ser. No. 61/073,735, titled "Iris Logarithm Representation", and filed on Jun. 18, 2008; the disclosure of which this application hereby incorporates by reference.

This application for letters patent also relates to and claims the benefit of U.S. Provisional Patent Application Ser. No. 61/073,734, titled "Segmentation of Iris Region for Iris Recognition Using Spiral Unwrapping", and filed on Jun. 18, 2008; the disclosure of which this application hereby incorporates by reference.

This application for letters patent also relates to and claims the benefit of U.S. Provisional Patent Application Ser. No. 61/045,962, titled "Iris Texture Quality Enhancement from Video Sequences", and filed on Apr. 17, 2008; the disclosure of which this application hereby incorporates by reference.

BACKGROUND OF THE INVENTION

1. Field of the Invention

The present invention relates, in general, to an image processing and biometric recognition technique. In particular, the present invention is a system and method for representing an iris image to enhance the recognition technique.

2. Description of the Related Art

A biometric recognition system operates by acquiring biometric data from an individual, extracting a feature set from the acquired data, and comparing this feature set against a template set in a database. The most common biometric data that prior art biometric recognition systems acquire include fingerprints, retinas, voice, and iris. Since the iris has the unique characteristic of very little variation over an individual's life and a multitude of variation between individuals, iris detection is one of the most accurate and secure means of biometric identification. Furthermore, since iris-based recognition systems have become more user-friendly, iris detection is not only one of the least invasive detection methods, but also cost-effective.

The prior art describes capturing an image of an eye and analyzing the image to produce an iris code. The prior art does not describe locating the iris in an image of an eye and representing the iris as a one-dimensional signal or iris string as disclosed herein. The prior art also does not describe using the iris string for feature extraction, encoding, and matching.

Iris recognition to identify a subject, such as a human, animal, or the like, has been proposed for more than 20 years and has been the subject of numerous prior art publications. The prior art includes many detailed illustrations of the idea about how to set up equipment for iris acquisition. This is a factor in practical iris recognition system because the iris is a very small area to detect in comparison to a face. The subject's face can be captured very easily and non-intrusively, but if we want to capture an iris image, the task became not so trivial. Therefore, how to setup the cameras and the lighting in order to capture a high quality iris image is an important factor. The prior art also describe the adoption of a digitalized controlled circuit where the camera and lighting are all controlled by a central processing unit. The prior art further proposes a new way of capturing an iris image so that there is no need to position the camera very close to the subjects, which greatly enhances the usability of iris recognition system in many practical situations. For iris segmentation work, the prior art only describes the use of a boundary detection algorithm or edge detection algorithm to localize the pupil. The prior art describes first finding the limbic boundary and pupil boundary, and at last, localize the eyelid boundary. However, the prior art does not describe how to match two irises and produce a score of likeness, and how much confidence can be based on the chosen threshold. The prior art only provides exemplary algorithms that may perform well in iris recognition, for example, the well-known Fisher LDA algorithm. The prior art also does not provide a substantial statistical analysis about how good iris recognition can perform in turns of False Acceptance Rate (FAR) and False Reject Rate (FRR).

However, the prior art does not describe how to capture the iris image in order to achieve such high recognition results. The prior art does not describe how good the iris image has to be in order to produce a clear iris code which can represent every detail in the iris pattern. Furthermore, the prior art describes methods to achieve such high quality iris images that involve the subject sitting on a chair, putting their head on a wooden rack, and keeping their eyes wide open while the camera takes the picture. This prior art method of iris acquisition will drastically reduce the practicality of the iris recognition system.

The prior art demonstrates that high quality iris acquisition gives results of good biometric matching, but reduces the practicality of the system. However, systems that can capture iris images in non-intrusive manners usually reduce the iris image quality and inevitably downgrade the iris recognition performance. The iris image quality and the ease of use of the iris acquisition system are important factors for a successful biometric identification system; yet it seems that they are two factors usually system designers have to tune to trade them off. The present invention of image enhancement technology acquires super high-resolution iris images while restricted conditions for the subjects are minimized during iris acquisition stage. The present invention achieves both of these goals (high quality iris image and the friendliness of the system), while also achieving high performance of iris recognition system.

SUMMARY OF THE INVENTION

Aspects of the present invention provide a method and system for uniquely identifying a subject based on an iris image. In one embodiment, after obtaining the iris image, the method produces a filtered iris image by applying filters to the iris image to enhance discriminative features of the iris image. The method analyzes an intensity value for pixels in the filtered iris image to produce an iris code that uniquely identifies the subject.

In another embodiment, the method creates a segmented iris image by detecting an inner and outer boundary for an iris region in the iris image, and remapping pixels in the iris region, represented in a Cartesian coordinate system, to pixels in the segmented iris image, represented in a log-polar coordinate system, by employing a logarithm representation process.

In another embodiment, the method creates a one-dimensional iris string from the iris image by unfolding the iris region by employing a spiral sampling method to obtain sample pixels in the iris region, wherein the sample pixels are the one-dimensional iris string.

BRIEF DESCRIPTION OF THE DRAWINGS

FIG. 11 is an exemplary illustration of the process of up-sampling an image.

FIG. 12 is an exemplary illustration of the process of breaking down a big image into patches.

DETAILED DESCRIPTION OF THE INVENTION

Computationally Efficient Feature Extraction and Matching Iris Recognition

The disclosed iris recognition process is a computationally efficient method for feature extraction and matching. The process generates a person-specific code that attempts to identify a unique iris pattern in one eye from an iris pattern in another eye. A system that performs this process will have the ability to identify a person from another person very quickly and robustly using a computationally efficient process. The disclosed invention employs operations that are relatively computationally inexpensive and simple, such as differencing, thresholding, and simple filtering. The disclosed invention improves upon the prior art conventional methods and processes iris data at a higher throughput rate.

Figure 1:
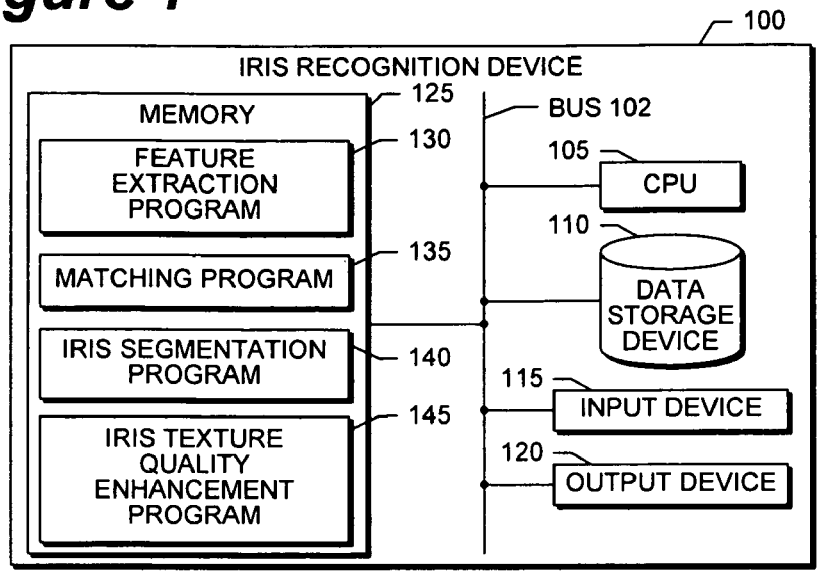
FIG. 1 is a block diagram that illustrates one embodiment of an iris recognition device that performs the present invention.

FIG. 1 is a block diagram that illustrates one embodiment of an iris recognition device that performs the present invention. As shown in FIG. 1, the iris recognition device 100 is a general-purpose computer. A bus 102 is a communication medium that connects a central processor unit (CPU) 105, data storage device 110 (such as a disk drive, flash drive, flash memory, or the like), input device 115 (such as a keyboard, keypad, touchscreen, or the like), output device 120 (such as a monitor, graphic display, or the like), and memory 125.

The CPU 105 can be a commercially available or custom microprocessor that performs the disclosed methods by executing the sequences of operational instructions that comprise each computer program resident in, or operative on, the memory 125. The reader should understand that the memory 125 may include operating system, administrative, and database programs that support the programs disclosed in this application. The memory 125 is representative of the overall hierarchy of memory devices containing the software and data used to implement the functionality of the computer 100. The memory 125 can include, but is not limited to, cache, ROM, PROM, EPROM, EEPROM, flash memory, SRAM, and DRAM. In one embodiment, the configuration of the memory 125 of the iris recognition device 100 includes a feature extraction program 130, matching program 135, iris segmentation program 140, and iris texture quality enhancement program 145. The feature extraction program 130 performs the method of the present invention disclosed in detail in FIG. 2 and FIG. 3. The matching program 135 performs the method of the present invention disclosed in detail in FIG. 4. The iris segmentation program 140 performs the method of the present invention disclosed in detail in FIG. 5. The iris texture quality enhancement program 145 performs the method of the present invention disclosed in detail in FIG. 8 and FIG. 9. These computer programs store intermediate results in the memory 125, or data storage device 110. In another embodiment, the memory 425 may swap these programs, or portions thereof, in and out of the memory 125 as needed, and thus may include fewer than all of these programs at any one time.

Figure 2:
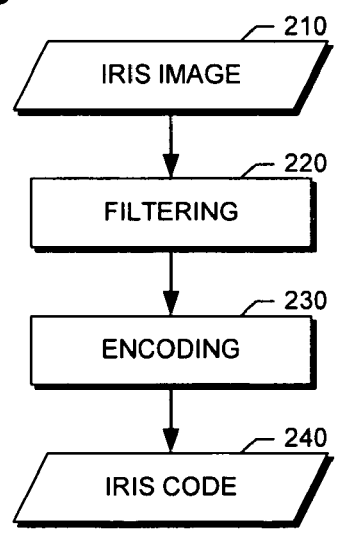
FIG. 2 is a flow chart that illustrates one embodiment of the basic approach to a feature extraction process to generate an iris code for the present invention.

FIG. 2 is a flow chart that illustrates one embodiment of the basic approach to a feature extraction process to generate an iris code for the present invention. As shown in FIG. 2, the feature extraction process receives an iris image 210 as an input and produces an iris code 240 as an output. The iris image 210 includes an original iris image without any preprocessing, a segmented iris image, or the like.

The process shown in FIG. 2 begins by loading the iris image 210 into a memory of a general-purpose computing device, such as the iris recognition device 100 shown in FIG. 1. The basic feature extraction process shown in FIG. 2 includes a filtering step 220 and an encoding step 230. The filtering step 220 is the process of enhancing or transforming the iris image 210 into filtered data, which is a suitable feature space for the encoding step 230. The filtering step 220 includes, but is not limited to, convolution, intensity normalization, or the like. The encoding step 230 is the process of performing a set of operations on the filtered data to construct the iris code 240. The encoding step 230 includes, but is not limited to, applying threshold, performing various types of quantization, or the like.

Figure 3:
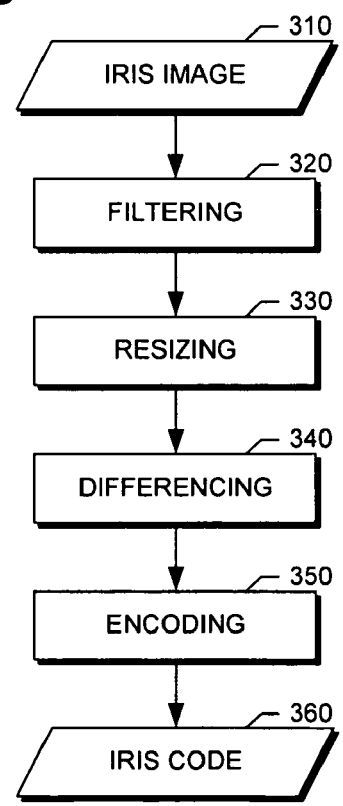
FIG. 3 is a flow chart that illustrates one embodiment of a detailed implementation of the feature extraction process that is a computationally efficient feature extraction and encoding process for the present invention.

FIG. 3 is a flow chart that illustrates one embodiment of a detailed implementation of the feature extraction process that is a computationally efficient feature extraction and encoding process for the present invention. As shown in FIG. 3, the process receives an iris image 310 as an input and produces an iris code 360 as an output. The iris image 310 includes an original iris image without any preprocessing, a segmented iris image, or the like.

The process shown in FIG. 3 begins by loading the iris image 310 into a memory of a general-purpose computing device, such as the iris recognition device 100 shown in FIG. 1. If the iris image 310 is a segmented image, the image format is in a two-dimensional format sampled from the original iris employing a mapping function including, but not limited to, log-polar segmentation, Cartesian segmentation, or the like. If the mapping function employs log-polar segmentation, a first axis maps to a region that is radially concentric to the pupil or iris, and a second axis maps a linear distance away from the origin of the pupil or iris. If the mapping function employs Cartesian segmentation, the axis remains in the original domain; however, the iris region is remapped to fit within two concentric circles of fixed radii.

The process shown in FIG. 3 applies various filtering techniques 320 to the segmented image to produce a filtered iris image. Applying the filters serves to enhance certain discriminative features of the iris. The filters include, but are not limited to, a lowpass filter, bandpass filter, highpass filter, edge enhancement, or the like.

The process shown in FIG. 3 continues by resizing 330 the filtered iris image to yield a resized iris image. In one embodiment, the resizing step 330 downsamples the filtered iris image by interpolating from intensity values in the normalized iris image. The interpolation methods include, but are not limited to, nearest neighbor, bilinear, bicubic, or the like.

The process shown in FIG. 3 continues by processing the resized image through a differencing operation 340 to generate a set of local difference images to yield a local difference iris image. In one embodiment, the process takes the difference between a pixel of the resized image and a specific neighbor to that pixel. For example, the difference may be taken between the intensity of a pixel and its immediate adjacent pixel to the right, left, up, down, or diagonal. In another embodiment, the difference calculation is not limited to directly adjacent neighbors and may extend further. For example, the difference may also be taken between the intensity of a pixel and its non-adjacent neighbor. Furthermore, the resulting local difference iris image may also be processed again using another local differencing process resulting in a set of local difference iris images.

The process shown in FIG. 3 continues by encoding 350 the set of local difference iris images, and quantizing them to create the iris code 360. In one embodiment, the set of local difference iris images are a single local difference iris image. The encoding step 350 employs various methods including, but not limited to, applying a threshold, quantization, a combination of these methods, or the like. In one embodiment, the encoding step 350 applies a threshold such that if the difference is greater than the threshold value, it is assigned a one (1) and if the difference is less than the threshold value, it is assigned a zero (0). If that difference is equal to the threshold value, the conflict can be resolved in several ways such as assigning it arbitrarily but consistently to a one (1) or a zero (0). In another embodiment, the encoding step 350 employs quantization based on whether a difference value is greater than or less than a threshold value. In yet another embodiment, the encoding step 350 employs quantization based on whether the magnitude of the difference is greater than or less than a threshold value.

In one exemplary embodiment, the computationally efficient feature extraction and encoding process shown in FIG. 3 comprises the following steps. The process obtains a segmented iris image 310 using a log-polar method. The process applies a filter 320 to the segmented iris image using a two-dimensional Gaussian filter with different sigma values for the Gaussian in the X and Y directions to yield a filtered iris image. The process resizes 330 the filtered iris image to a dimension of 25 pixels by 180 pixels using a "Nearest Neighbor" interpolation method to yield the resized iris image. The process computes the local difference 340 of each pixel in the resized iris image with its adjacent neighbor to the right to yield a local difference iris image. For the pixels located in the last column of the resized iris image, the process circularly accesses the pixels on the first column to take the difference. The process computes the local difference again using the same process, but this time from the local difference iris image. This computation will yield the second local difference iris image. The two local difference iris images comprise the set of local difference iris images. The process creates the iris code 360 by concatenating the set of local difference iris images and applying a threshold on each pixel 350. If a pixel intensity of the concatenated local difference iris images is above zero (0), the pixel value is set to one (1). Likewise, if a pixel intensity is less than or equal to zero (0), the pixel value is set to zero (0). Lastly, the process converts the thresholded image into a binary bitmap of ones (1) and zeros (0) into a format where the pixel location and the thresholded value at that pixel location are preserved. This exemplary embodiment is provided to further describe and clarify the present invention. In other exemplary embodiments, the process may apply different filters, resizing operations, difference and quantization, and encoding methods. Furthermore, the process may modify the order of the operations or add additional operations in-between the steps described in the process.

Figure 4:
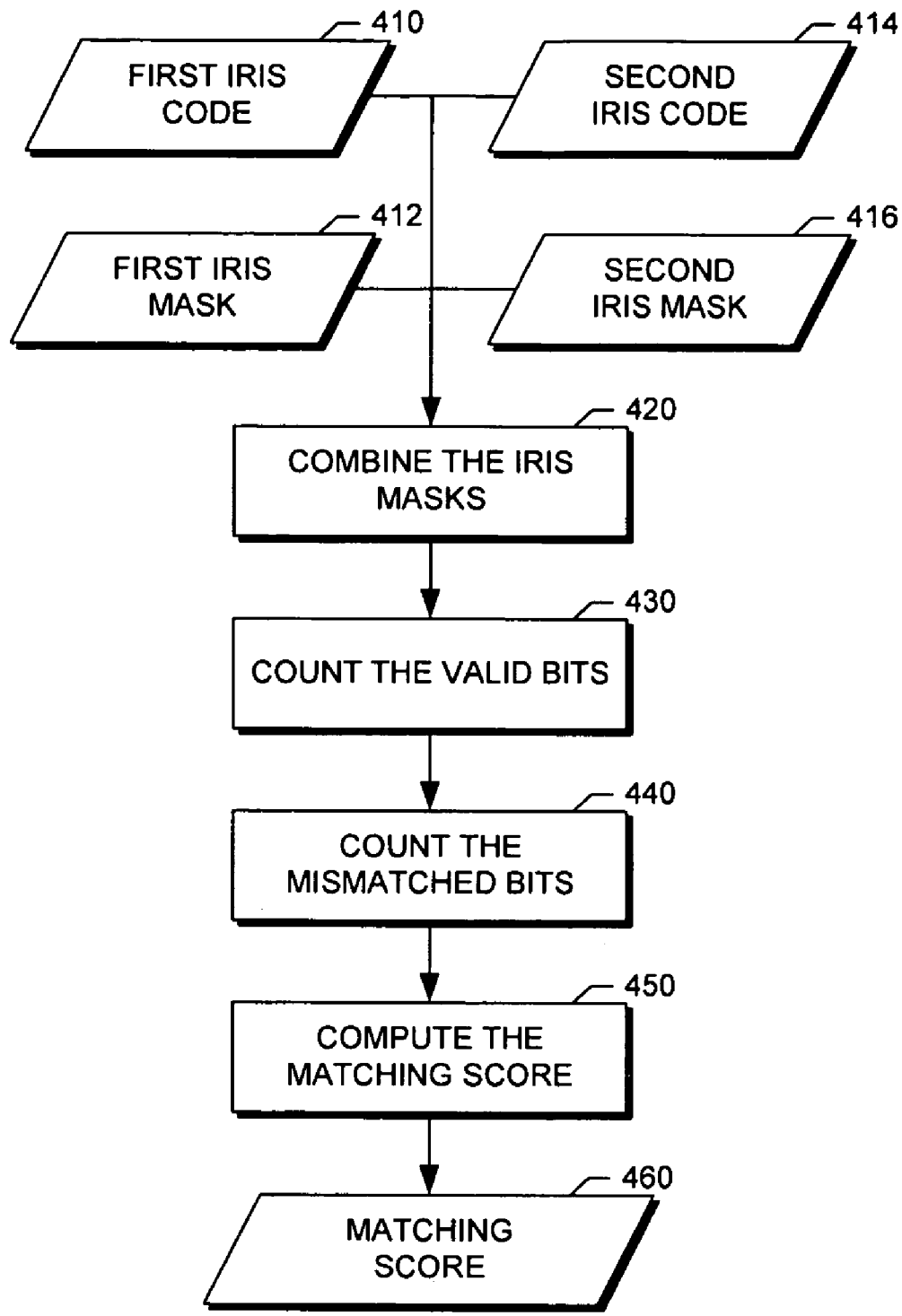
FIG. 4 is a flow chart that illustrates one embodiment of an iris code matching process for the present invention.

FIG. 4 is a flow chart that illustrates one embodiment of an iris code matching process for the present invention. As shown in FIG. 2, the iris code matching process describes the approach for computing a matching score 460 between a first iris code 410 and first iris mask 412 pair and a second iris code 414 and second iris mask 416 pair. The first iris mask 412 and second iris mask 416 are created by a prior art process. An iris mask is a bitmap that has the same dimensions as the iris code. It designates the indices of the iris code where it is considered valid. Regions of the iris code might be considered invalid for cases such as eyelid occlusion, eyelash occlusion, image artifacts on regions of the iris code, or the like.

The process shown in FIG. 4 begins by loading the first iris code 410 and first iris mask 412 pair and a second iris code 414 and second iris mask 416 pair into a memory of a general-purpose computing device, such as the iris recognition device 100 shown in FIG. 1. An iris mask represents the valid regions (i.e., list of indices) of the iris code to use for matching. For example, if the iris mask at index i is true, then use index i of the iris code for matching. Likewise, if the value of iris mask at index i is false, then neglect index i of iris code for matching. The method then combines 420 the first iris mask 412 and second iris mask 416 such that the resulting combined iris mask specifies the indices of the iris masks where both iris codes are valid. The method counts the total number of valid indices 430 in the combined mask. This value will be referred to as the number of valid bits. Where both iris codes are valid based on the combined iris mask, the method counts the number of indices where the two iris codes differ 440. This value will be known as the number of mismatched bits. Where the first iris code 410 and the second iris code 414 match for the indices denoted as valid in the combined iris mask, the method counts the number of bits that match. This value will be known as the number of matched bits. In one embodiment, the process then computes 450 the matching score 460 by dividing the number of matched bits by the number of valid bits. In another embodiment, the process then computes 450 the matching score 460 by dividing the number of mismatched bits by the number of valid bits.

Iris Logarithm Representation

Figure 5:
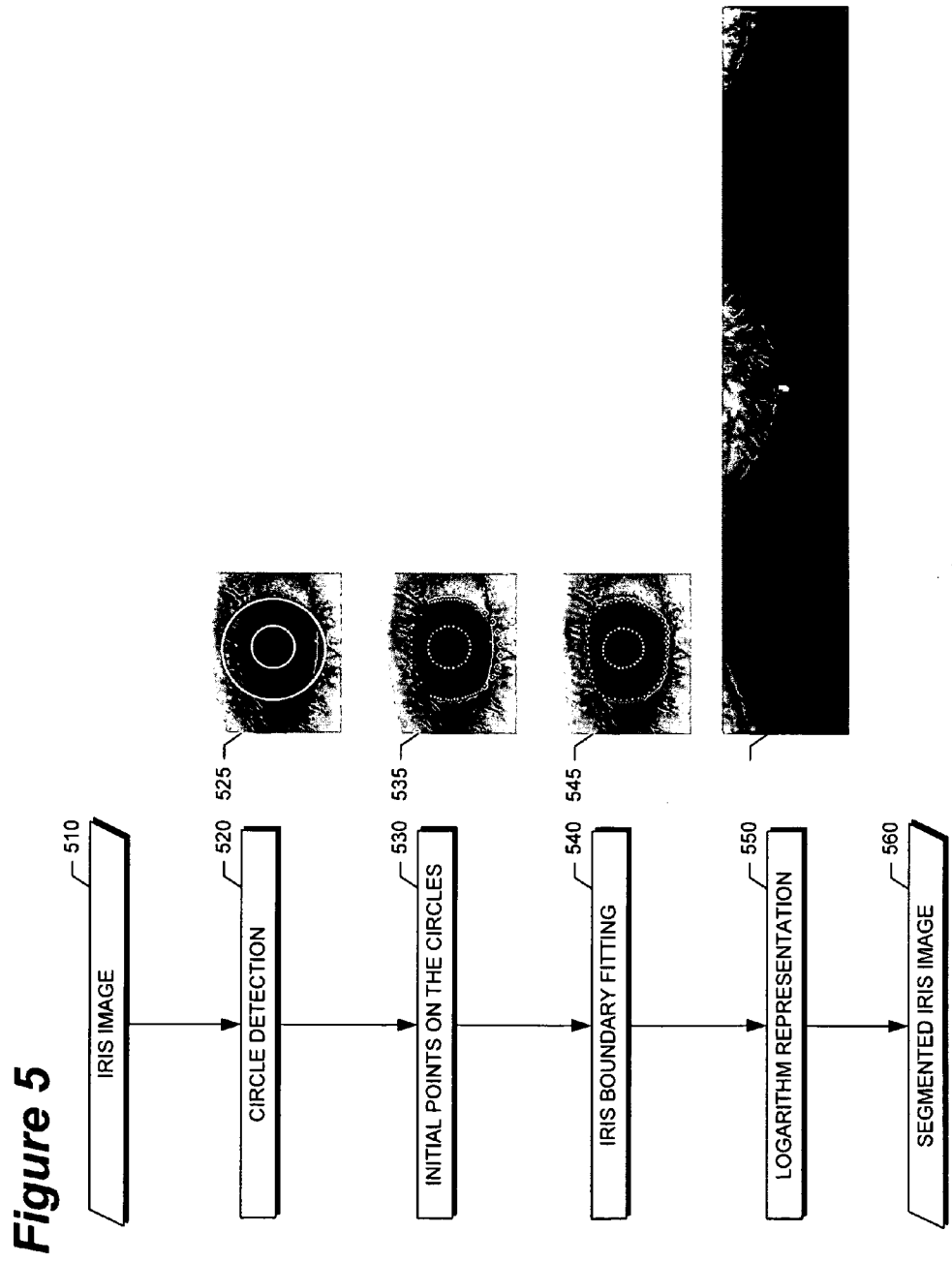
FIG. 5 is a flow chart that illustrates one embodiment of the iris segmentation process for the present invention.

FIG. 5 is a flow chart that illustrates one embodiment of the iris segmentation process for the present invention. As shown in FIG. 5, the iris segmentation process includes two steps, iris boundary fitting, and logarithm representation. The iris segmentation process is a two-step process, detecting two approximate circles around a pupil and a sclera, and refining the approximate circles to detect pupil and sclera boundaries that are more accurate.

The process shown in FIG. 5 begins by loading the iris image 510 into a memory of a general-purpose computing device, such as the iris recognition device 100 shown in FIG. 1. The iris segmentation process then employs circle detection 520, or other methods, to detect two approximate circles that define the inner (pupil) boundary and the outer (sclera) boundary of the iris. FIG. 5 includes an exemplary illustration of employing circle detection 525. Occlusion by the eyelids and eyelashes often make it difficult to obtain a whole iris region. In particular, the upper eyelids and eyelashes often partly or severely occlude the upper outer boundaries of the iris region. To get successful results of iris recognition in spite of these occlusion problems, the present invention detects and excludes the occlusion regions during segmentation. After detecting two approximate circles around a pupil and a sclera, the iris segmentation process refines the approximate circles by selecting a number of initial points on the circles 530, and employing iris boundary fitting 540. FIG. 5 includes an exemplary illustration of selecting initial points on the circles 535, and employing the iris boundary fitting 545. The present invention uses energy-minimizing methods or splines, such as active contours, snakes, or other morphological, and image and computer vision processing methods, to detect boundaries that are more accurate. The true iris region has an annular shape, resembling a ring. In various embodiments, the annular shape may be circular, elliptical, or arbitrary shaped. In another embodiment, the shape of the approximate region for the pupil differs from the shape of the approximate region for the sclera. After detecting the true iris region, the iris segmentation process then employs a logarithm representation process 550 to convert the true iris region to a rectangular shape. FIG. 5 includes an exemplary illustration of the true iris region converted to a rectangular shape 555.

Figure 6:
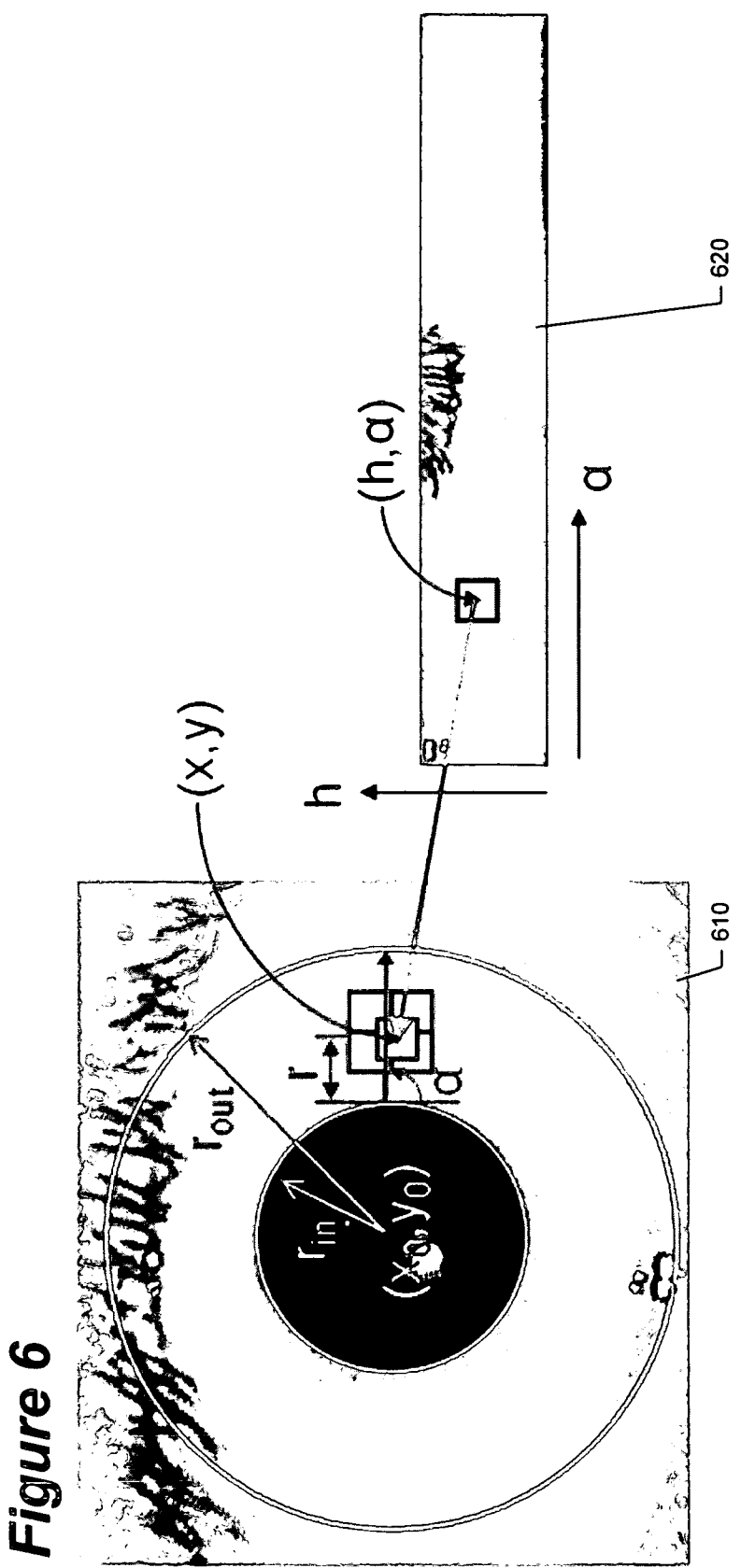
FIG. 6 illustrates the conversion of the coordinate system in an image from the log-polar coordinate to Cartesian coordinate.

The annular shape of the extracted iris region allows the logarithm representation process of the present invention to unfold the iris region by remapping the coordinate system in an image from the Cartesian coordinate system to the log-polar coordinate system as shown in FIG. 6. FIG. 6 depicts an original image 610 of the detected true iris image and an output image 620 converted to a rectangular shape. To decide the intensity value at each pixel (h, α) in the output rectangular image 620, the corresponding pixel (x, y) in an original image 610 is calculated using r and α; α is easily obtained by the horizontal index in the output image, and r is calculated by $r=s \exp(\beta h)$, where s is a scaling factor to map the vertical indices in an output image linearly into $[0, r_{out}-r_{in}]$. In another embodiment, r is calculated by $r=s \log_b(\beta h)$, where b is the base. Finally, (x, y) corresponding to (h, α) is calculated by $x=(r+r_{in})\cos \alpha + x_0$ and $y=(r+r_{in})\sin \alpha + y_0$. If x and y are integers, the pixel (h, α) can easily take the same intensity value as in (x, y). Actually, x and y are usually not integers, so we take the weighted sum of the intensities in the four pixels around the exact (x, y) by linear interpolation.

Figure 7:
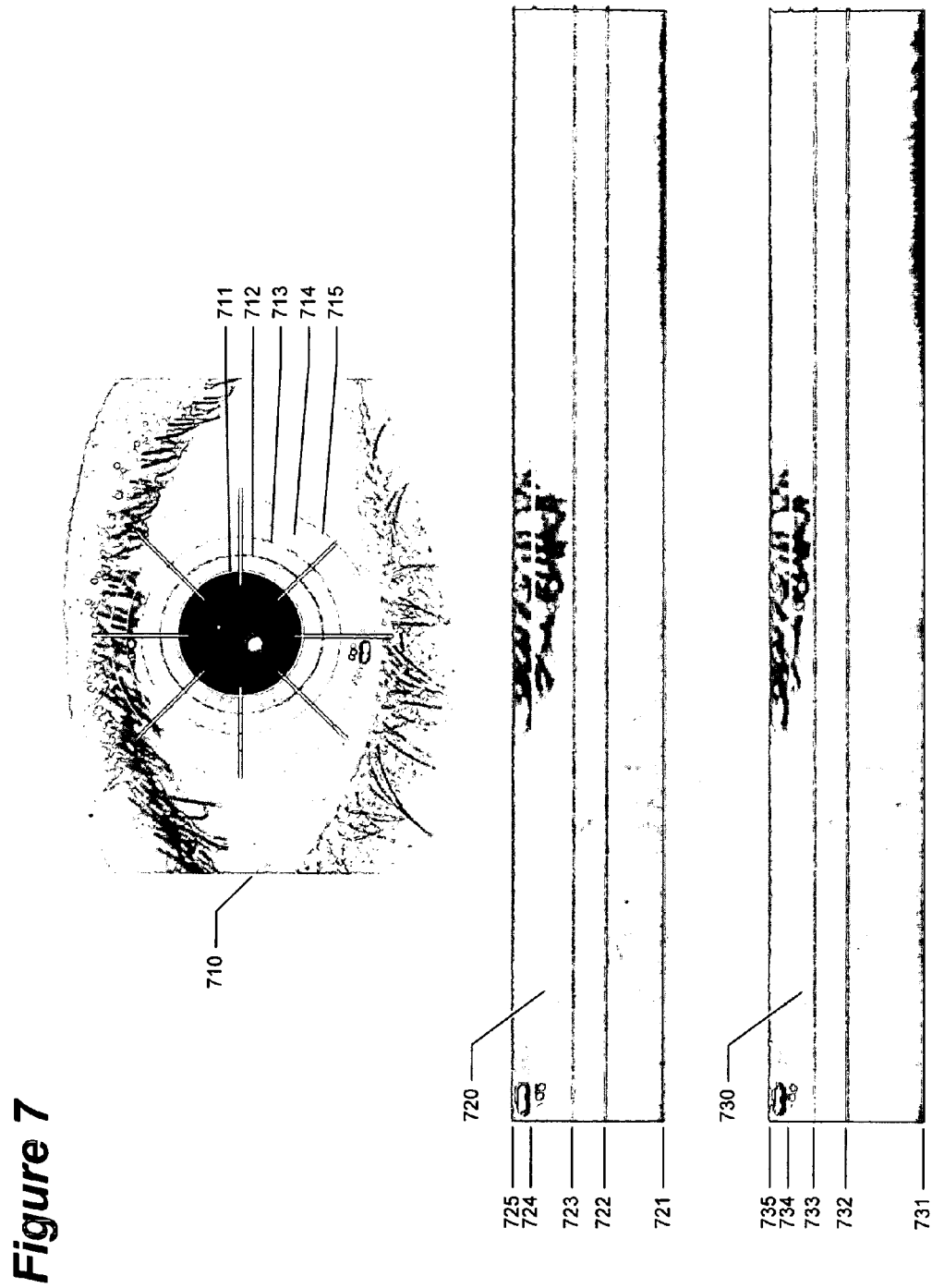
FIG. 7 illustrates a raw eye photo and various embodiments of iris logarithm representation of the present invention.

FIG. 7 illustrates a raw eye photo and various embodiments of iris logarithm representation of the present invention. FIG. 7 shows an original eye image 710 with a log-polar coordinate overlay that includes concentric circles 711, 712, 713, 714, 715, where the innermost concentric circle 711 is at the pupil boundary, and the outermost concentric circle 715 is at the sclera boundary. FIG. 7 also illustrates a first embodiment 720 and a second embodiment 730 of the iris logarithm representations of the present invention. Various embodiments of the iris logarithm representations change the parameters of the equations associated with the coordinate system shown in FIG. 6 to obtain different logarithm sampling. As shown in FIG. 7, the first embodiment 720 and the second embodiment 730 change the β parameter. By varying the parameters in the equations associated with the coordinate system shown in FIG. 6, the present invention may tune the log sampling to emphasize more of the iris region near the pupil region boundary, or more of the iris region near the sclera region boundary. As shown in FIG. 7, the concentric circles 711, 712, 713, 714, 715 of the log-polar coordinate overlay for the original eye image 710 appear as straight lines in the first embodiment 720 and second embodiment 730 of the iris logarithm representations. The straight lines 721, 722, 723, 724, 725 of the first embodiment 720 correspond, respectively, to concentric circles 711, 712, 713, 714, 715 for the original eye image 710. Similarly, the straight lines 731, 732, 733, 734, 735 of the second embodiment 730 correspond, respectively, to concentric circles 711, 712, 713, 714, 715 for the original eye image 710. These straight lines illustrate that the second embodiment 730, when compared to the first embodiment 720, shows more emphasis and zooming of the inner annular portion (between the innermost concentric circle 711 and the next outer concentric circle 712) of the iris region (i.e., the portion of the iris region near the pupil boundary) and less emphasis and zooming toward the outer annular portion (between the outermost concentric circle 715 and the next inner concentric circle 714) of the iris region (i.e., the portion of the iris region near the sclera boundary). The change in emphasis and zooming has a number of advantages. First, since the portion of the iris region near the pupil boundary is thought to be more discriminative for certain populations, the emphasis and zooming of the present invention enhances the ability of the iris logarithm representation as a biometric recognition technique. Second, the emphasis and zooming of the present invention makes the iris logarithm representation less prone to eyelash and eyelid occlusion. Furthermore, since the emphasis and zooming of the present invention is variable by tuning the parameters of the log sampling, the present invention analyzes each eye image, independently, and tunes the parameters to select the log sampling that will produce the best iris logarithm representation for that eye image.

Segmentation of Iris Region for Iris Recognition Using Spiral Unwrapping

In another embodiment, the present invention represents the located iris as a one-dimensional signal or iris string by taking samples from the iris image while spiraling outward from the pupillary boundary to the sclera boundary. After obtaining the iris string representation, feature extraction and iris coding processes can take place using one-dimensional filters or other one-dimensional feature extraction methods, resulting in a very computationally efficient feature extraction and matching process. The computational efficiency improvements will allow processing of iris image data at greater throughput rates than with prior art methods.

Referring again to FIG. 5, after circle detection 520, and boundary fitting 530, 540 to detect the true iris region, in one embodiment, the iris segmentation process takes samples of the iris image spiraling outward from the pupil boundary. The present invention uses the discovered inner circular boundary (pupil boundary) and the outer circular boundary (sclera boundary) of the true iris region, to convert this region to a one-dimensional representation. In various embodiments, the inner boundary is elliptical or arbitrary shaped, and the outer boundary is elliptical or arbitrary shaped. Thus, after detecting the true iris region, an extracted iris region has an annular shape, resembling a ring, and may be circular, elliptical, or arbitrary shaped. The annular shape enables the present invention to unfold the iris region by sampling points. In one embodiment, the spiral sampling is outward from the pupillary boundary toward the sclera boundary. In another embodiment, the spiral sampling is inward from the sclera boundary toward the pupillary boundary. Since the pupil and iris may not be concentric, the present invention normalizes the spiral sampling method to maintain a consistent number of samples between the pupil boundary and the iris boundary at every angle θ. Thus, one property of the one-dimensional iris string representation is that it is always of the same length regardless of the size of the iris or pupil, and regardless of the degree of pupil dilation. The iris string representation may also have a degree of rotational invariance in further processing on this domain by a simple process of shifting the one-dimensional iris string to the left or right by fixing the angle step between adjacent samples. In various embodiments, the spiral sampling method may employ a linear, Archimedean, or logarithmic spiral. In another embodiment, since the pupil and the iris may not be concentric, the spiral sampling method chooses a spiral shape that obtains a selected number of turns on each side. The spiral unwrapping can be an increasing function of radius as angle increases, but can also be a complete dense sampling which samples as a function of complete angular sampling and then increasing the radius for another complete angular sampling, so that the spiral increasing radius can be a function of a complete angular slice sampling of iris.

Iris Texture Quality Enhancement from Video Sequences

The present invention records the iris of subjects with a video capture device. The video capture device captures the irises sequentially. Therefore, many images of the same iris have been taken in different time stamps, with those time stamps spaced with short intervals.

The present invention takes a series of iris video images, finds internal information among each image, fuses the internal information in an intelligent way, and generates a new iris images that have much more detailed information about iris patterns than any of the input iris images.

The present invention analyzes the information content of the input images by decomposing the input iris images into some form of representations with two dimensional signal basis. The decomposition procedure in the algorithm may include, but is not limited to, Fourier analysis (two-dimensional Fourier Transform), wavelet decomposition, principal component analysis, Fisher's linear discriminant analysis, fractal geometry, and the like.

The information fusion process of the present invention may employ many alternative algorithms, all of which all can serve to achieve the same goal. The choices of algorithm include, but is not limited to, linear combination of pixel-wise information, Artificial Neural Network (ANN), Hidden Markov Model (HMM), Probabilistic Graphical Model, and the like.

The video capture device of the present invention includes, but is not limited to, digital cameras of any brand, digital camcorders of any brand, traditional film cameras that have the ability to convert the images to a digital form, and the like.

The digital form of the present invention include digital images that contains pixel-wise information of iris pattern and includes, but is not limited to, the popular digital image format used in modern computer systems, for example, with the file extensions like bmp (Bitmapped image), eps (encapsulated postscript), tiff or tif (Tagged Image File Format), jpeg or jpg (Join PhotoGraphic Experts Group), gif (Graphics Interchange Format), pict, and the like.

The iris acquisition procedure of the present invention may include a subject standing or sitting at a fixed place, may include the subject placing their chin against a fixed apparatus, and may include the subject looking at a pre-defined location or point. However, the method of the present invention minimizes the restrictions on the iris acquisition procedure.

Figure 8:
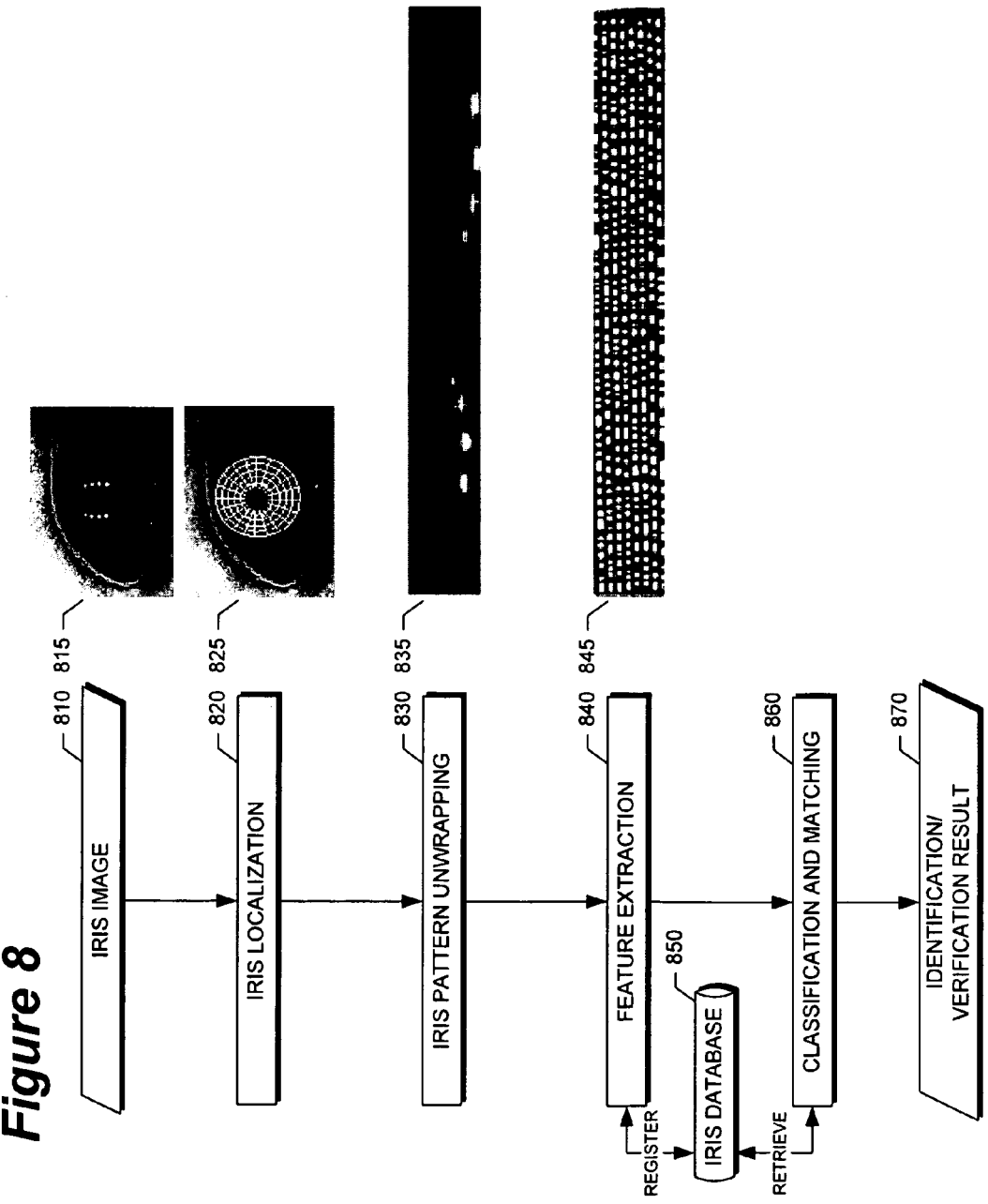
FIG. 8 is a flow chart that illustrates one embodiment of the process for a typical iris recognition system of the present invention.

FIG. 8 is a flow chart that illustrates one embodiment of the process for a typical iris recognition system of the present invention. The main component or function modules are depicted as rectangles, with the exemplar images by its right side. Most parts of the iris recognition framework mentioned here is following the framework described in prior art patents, though the matching and classification can be replaced by other modern machine learning algorithms.

The process shown in FIG. 8 begins by loading a raw iris image 810 into a memory of a general-purpose device, such as the iris recognition device 100 shown in FIG. 1. An exemplar raw iris image 815 is shown in FIG. 8. The raw iris image 810 is fed into the iris localizer module 820, which finds the inner boundary (between iris and pupil) and outer boundary (between iris and sclera) of an iris. An exemplar eye image 825 after processing by the iris localization module 820 is shown in FIG. 8.

The results of iris localization will tell us the location of every point on inner and outer boundaries. After this information is given, the iris pattern can be "unwrapped" from an annular shape (in the original Cartesian coordinate) to a rectangular shape in the iris pattern unwrapping module 830. An exemplar unwrapped iris pattern 835 is shown in FIG. 8. The new rectangular shape is arranged in log-polar coordinate. The horizontal axis denotes the angle θ between the horizontal line (which is of zero degree) and the line connecting center of pupil to the current pixel. Therefore, the value of horizontal axis spans from 0 to 360 degrees. The vertical axis denotes the distance r between current pixel and the closest pixel on the pupil boundary. The iris pattern unwrapping module 830 (i.e., coordinate transformation process) uses the logarithm representation 550 shown in FIGS. 5, 6, and 7, or a prior art transformation process.

The advantage of coordinate transformation is to provide a normalized iris pattern which is independent of the influence of pupil dilation or contraction, and also independent of the problem caused by non-concentricity of the pupil and iris. One can understand this advantage by a simple imagination. Assume the pupil of the exemplar raw iris image 815 dilates to double size, if we compare the two iris pattern in Cartesian coordinate (before unwrapping), the differences between them will be huge because some part of iris pattern in un-dilated version is mapped to the pupil area in dilated version. But, if the iris pattern is transformed to log-polar coordinate, the two iris pattern will maintain great similarity.

Another advantage of coordinate transformation is that it makes easier to solve the problem when the iris image (or the raw eye image 815) is slightly rotated. As one can imagine, the head position of subjects cannot always be exactly the same position when the picture is taken. Therefore, it is highly possible that the raw eye image may have a rotational shift compared to image stored in iris database. Again, by simply comparing image in Cartesian coordinate cannot solve the problem because the distance between these two patterns will be large. But, if we transform iris pattern to log-polar coordinate, the rotational shift will become translation in x coordinate. Hence, one can simply shift the reference image (or the test image) a certain amount of pixel before matching the two patterns, and choose the best result among the multiple comparisons.

After the iris pattern is transformed into log-polar coordinate, it goes into the feature extraction module 840 to extract features from the unwrapped image 835. In this stage, different kinds of bandpass filters can be applied to the unwrapped iris image 835, and the output will be stored as features of the iris pattern. Note that different prior art uses different type of filters. For the purpose of this invention, how a feature is extracted is not the main concern. Therefore, any kind of feature extraction can be utilized in this iris recognition framework. An exemplar iris feature image 845 after feature extraction is shown in FIG. 8.

After the iris feature image 845 is extracted, the iris recognition framework can register this iris feature image 845 with an iris database 850. In one embodiment, when the iris recognition framework performs identification or verification of a subject, the iris feature image 845 would need to be retrieved to the system to allow classification module 860 to start its job. According to the type of feature, different classification schemes may be utilized. For the purpose of this invention, how classification is performed is not the main concern either. Any classification algorithm will do as long as it works for the corresponding feature scheme.

After the classification, an identification/verification result 870 is determined based on the lowest distance or highest similarity score. An exemplar decision about the subject's identity would identify the name of the person associated with the raw iris image 815.

Figure 9:
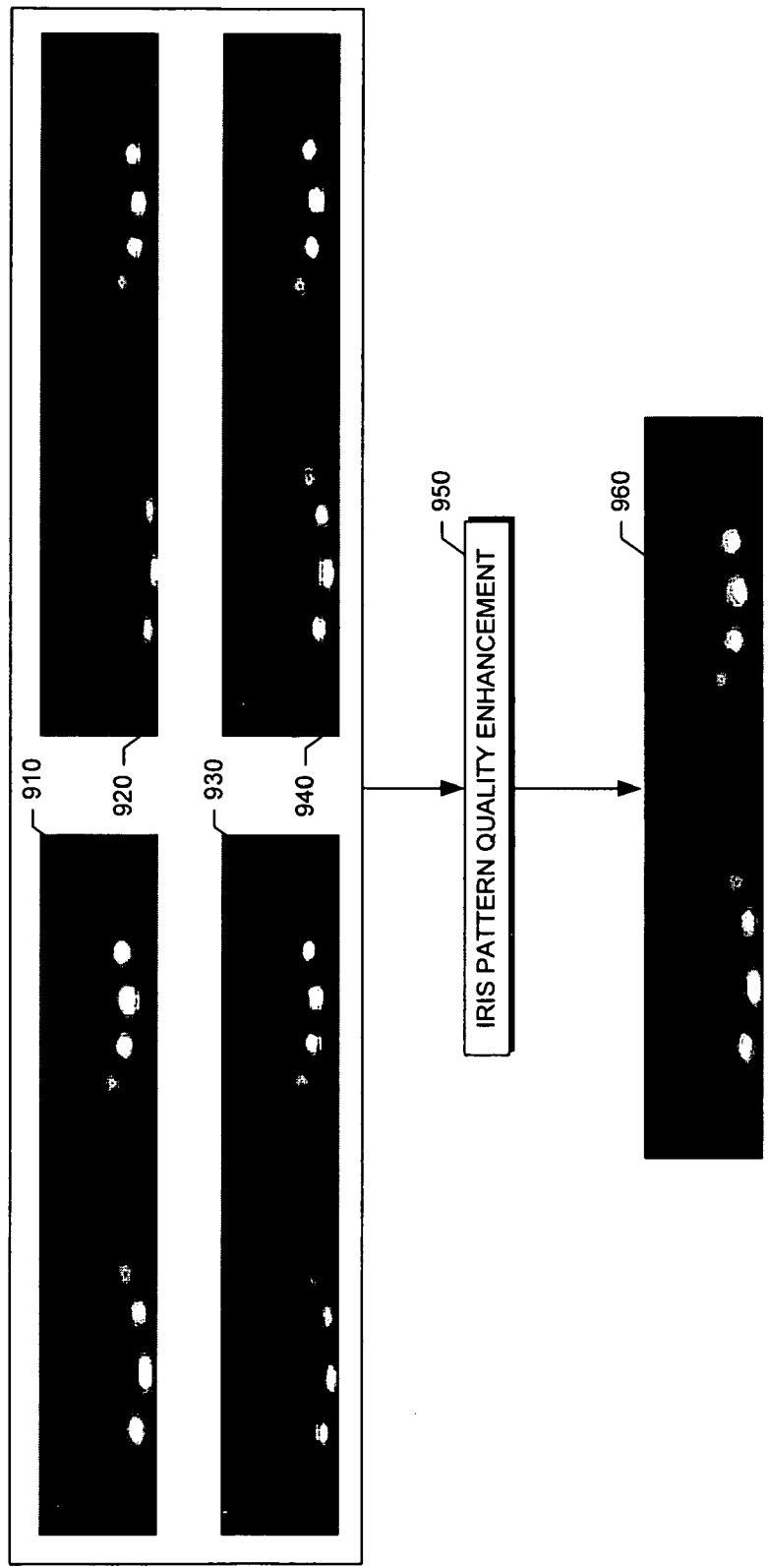
FIG. 9 is a flow chart that illustrates one embodiment of an iris texture quality enhancement process of the present invention.

FIG. 9 is a flow chart that illustrates one embodiment of an iris texture quality enhancement process of the present invention. As shown in FIG. 9, an iris acquisition device captures a series of pictures taken from the same subject. The iris texture quality enhancement module 950 works as a middle layer between the iris pattern unwrapping module 830 and the feature extraction module 840 shown in FIG. 8. The assumption is that we have input raw eye image from a video sequence. Therefore, the number of the same iris patterns should be more than at least three. Let us say there are four iris patterns of the same subject (and the same eye) recorded in this video sequence. After iris localization 820 and processing by the iris pattern unwrapping module 830, there should be four rectangular images 910, 920, 930, 940 similar the exemplar unwrapped image 835. The iris texture quality enhancement module will take these four images 910, 920, 930, 940 as input and produce one high quality iris image 960, also in rectangular form (polar coordinate) which has the same resolution as the input images 910, 920, 930, 940. After that, the newly generated high quality iris image 960 will be used in feature extraction and classification framework.

Figure 10:
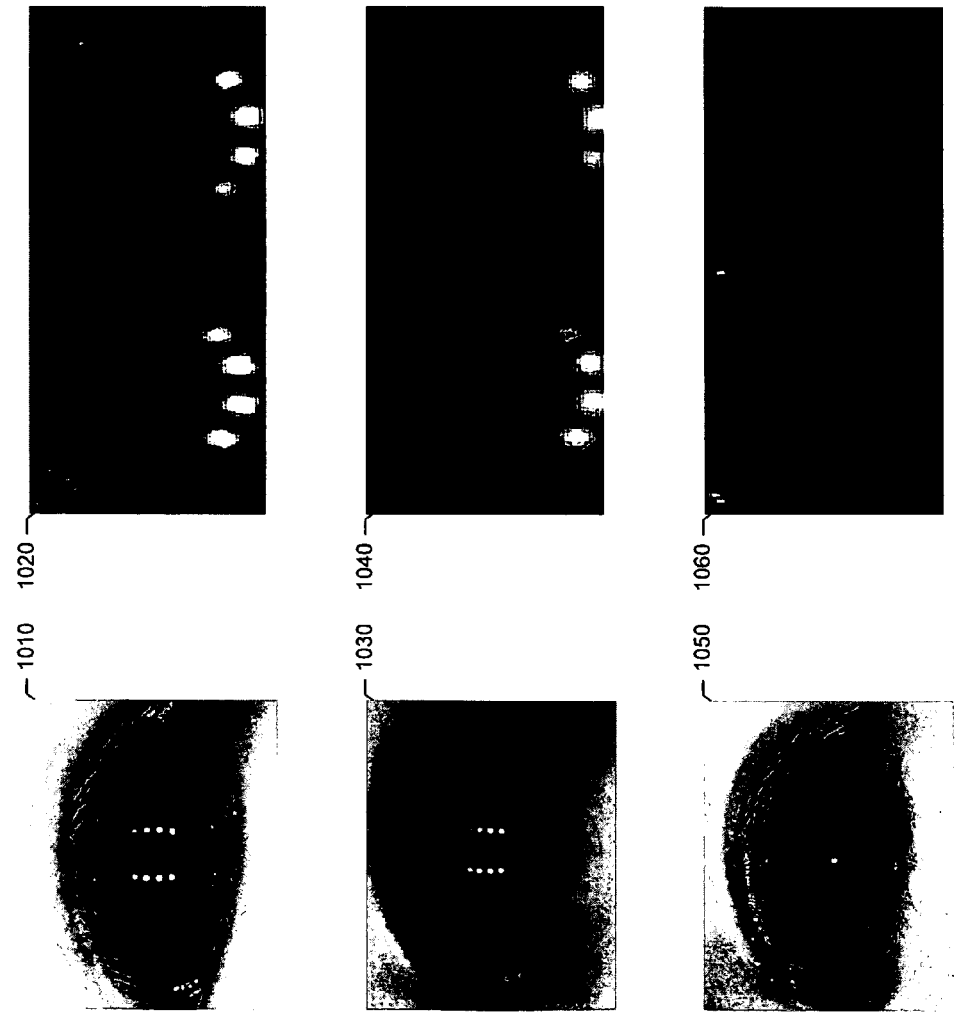
FIG. 10 is an exemplary set of raw iris images and the corresponding iris texture patterns in log-polar coordinates of the present invention.

FIG. 10 is an exemplary set of raw iris images and the corresponding iris texture patterns in log-polar coordinates of the present invention. As shown in FIG. 10, the first raw iris image 1010 and the second raw iris image 1030 were taken of the same subject, with a video recording device. As one can imagine, in the whole video sequence of eye images, some of them might be taken within an effective range of focus zone, and have higher quality, but some may not. The first raw iris image 1010 is an example of a high quality picture. On the contrary, the second raw iris image 1030 is an example of a low quality image. After performing iris localization 820 on the first raw iris image 1010, the iris boundary can be found, and the annular iris region can be unwrapped to a rectangular map as shown as the first iris texture pattern in log-polar coordinates 1020. The same procedure performed on the second raw iris image 1030 results in another rectangular map as shown as the second iris texture pattern in log-polar coordinates 1040. By comparing the first iris texture pattern in log-polar coordinates 1020 with the second iris texture pattern in log-polar coordinates 1040, it is very clear that the first iris texture pattern in log-polar coordinates 1020 has much more detailed information about iris pattern (for examples, the furrow and ridges in the iris pattern) than the second iris texture pattern in log-polar coordinates 1040. Experimental result also tells the same results. The third raw iris image 1050 shown in FIG. 10 is another raw eye image of the same subject, taken with another high resolution camera. In the third iris texture pattern in log-polar coordinates 1060, one can see much more detailed information than in either the first iris texture pattern in log-polar coordinates or the second iris texture pattern in log-polar coordinates. After performing a matching algorithm between the first iris texture pattern in log-polar coordinates 1020 and the third iris texture pattern in log-polar coordinates 1060, and between the second iris texture pattern in log-polar coordinates 1040 and the third iris texture pattern in log-polar coordinates 1060, similarity scores between these two pairs are obtained. The similarity score between the first iris texture pattern in log-polar coordinates 1020 and the third iris texture pattern in log-polar coordinates 1060 is 0.5288. The similarity score between the second iris texture pattern in log-polar coordinates 1040 and the third iris texture pattern in log-polar coordinates 1060 is 0.3825. Thus, the first iris texture pattern in log-polar coordinates 1020 and the third iris texture pattern in log-polar coordinates 1060 are more similar than the second iris texture pattern in log-polar coordinates 1040 and the third iris texture pattern in log-polar coordinates 1060.

From this experiment, one can see that the similarity score may go down a great level for the same subject, with exactly the same iris acquisition device, just because of the clarity of the former image or the blurring effect of the latter image. There might be many reasons which account for blurring of the images. For example, images are blurred when the positioning of the subject is out of the focus zone, when either the subject or camera is moving, or when there is strong level of noise. All of these difficulties may arise during practical iris recognition deployment. Therefore, it is very important to enhance the quality of iris images before it goes into feature extraction and matching stages.

FIG. 11 is an exemplary illustration of the process of up-sampling an image. The first step in the image quality enhancement algorithm is to choose one image among all input images to be the template image. After the template image has been chosen, up-sample it into a double-sized image, with zeros (0's) interpolated in between every pair of the pixels in template image. Since every image in its digital form can be represented as a two dimensional real value matrix, the illustration shown in FIG. 11 starts with a very simple 2×2 matrix 1110. After up-sampling process, the up-sampled 2×2 matrix 1110 becomes a 4×4 matrix 1120. One can see that the 4×4 matrix 1120 inserts zeros (0's) in between every pair of pixels in the 2×2 matrix 1110. Note that the up-sampling process will double the size of the image.

A more realistic up-sampling example is shown in the iris template images shown in FIG. 11. The first iris template image 1130 is a chosen iris template image. After the up-sampling process, the first iris template image 1130 becomes a double-sized second iris template image 1140, with zeros (0's) inserted in between every pair of pixels of the first iris template image 1140.

FIG. 12 is an exemplary illustration of the process of breaking down a big image into patches. All other input images that are not chosen to be template are called scene images. The second step of image quality enhancement procedure is to break all input images (including template and scene image) into pictures of smaller sizes. These smaller size images are called "patches" in the domain of image processing. As shown in FIG. 12, the first image 1210 is one of the input images with a size of 60×360. If we break the first image 1210 into patches of smaller sizes, say 30×15, the second image 1220 will be the output image, which includes a total of 48 patches (48=2×24). Note that the size of both the iris image and the patches are just an example. The algorithm covered in this patent is not restricted in the size of the image and patches. That means, any image size and patch size will fit in the algorithm of the present invention.

Figure 13:
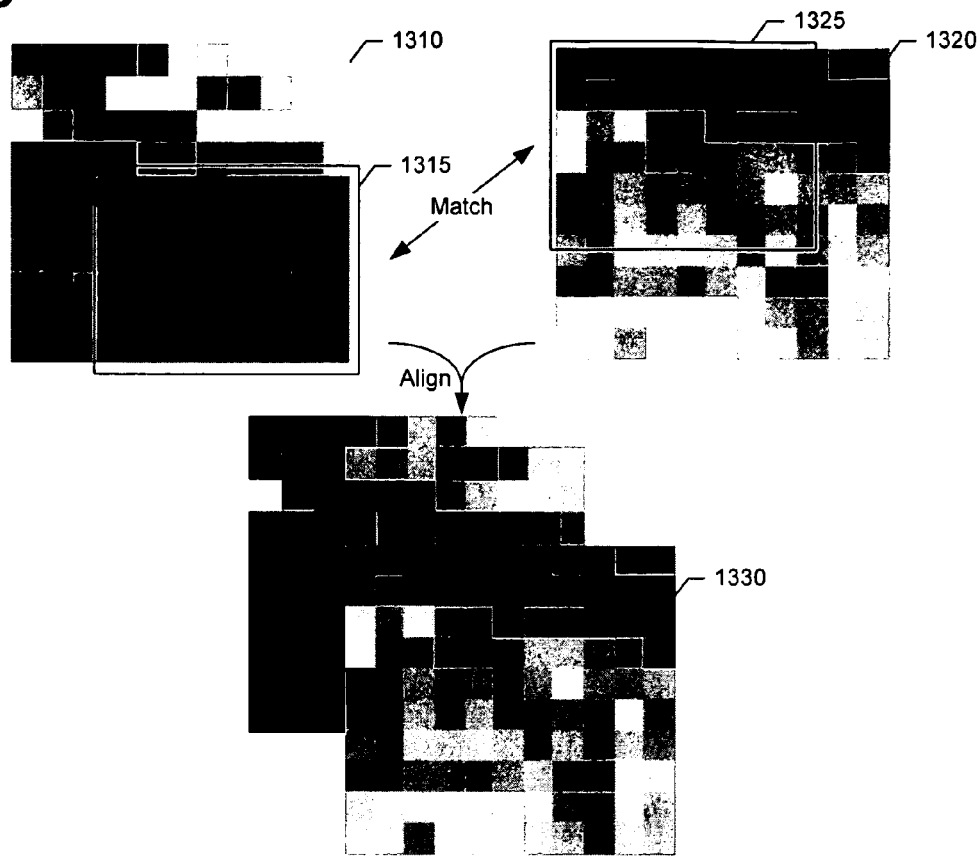
FIG. 13 is an exemplary illustration of the process of matching and alignment of two patches.

FIG. 13 is an exemplary illustration of the process of matching and alignment of two patches. The third step for image quality enhancement is to match the patterns in one patch to the patch from another image. As shown in FIG. 7, the first input image 1310 and the second input image 1320 are two patches from different images. The first input image 1310 is one patch from a template image, and the second input image 1320 is another patch which is in a corresponding location of the first input image 1310, from scene image. Because of the variability of the iris patterns, template and scene images may not match and align to each other. What makes the problem more difficult is that these two images may have local distortion scattered all over the entire image plane. In other words, if we want to align template and scene image, the alignment process has to be done locally, instead of globally. It justifies why we would like to break the iris pattern into many smaller sized image (patches) because it helps us to match and align pattern locally.

By performing normalized correlation, one can measure at which location two images match each other best. As shown in FIG. 13, the region in the first input image 1310 marked by a rectangle 1315 clearly matches to the region in the second input image 1320 marked by a rectangle 1325. One important thing during matching is that the goal of matching is to match the detailed variation in texture of the two images, not the absolute pixel value. In the case of the example images shown in FIG. 13, when looking closely, one can see that the intensity of the two rectangle region in the patch in the first input image 1310 and the second input image 1320 are not exactly the same. The intensity variation (contrast) in the rectangle region 1315 of the first input image 1310 seems smoother than the intensity variation in the rectangle region 1325 of the second input image 1320. However, the texture patterns in those two rectangles are the same. As long as two texture patterns are the same, though absolute pixel value may be different, they can be matched to each other.

Therefore, the first input image 1310 patch can be aligned with second input image 1320 patch to give the aligned image 1330. The aligned image 1330 is a new pattern compared to either the first input image 1310 or the second input image 1320. For the first input image 1310, the aligned image 1330 provides new information outside of its southeast boundary. For the second input image 1320, the aligned image 1330 provides new information outside of its northwest boundary.

Figure 14:
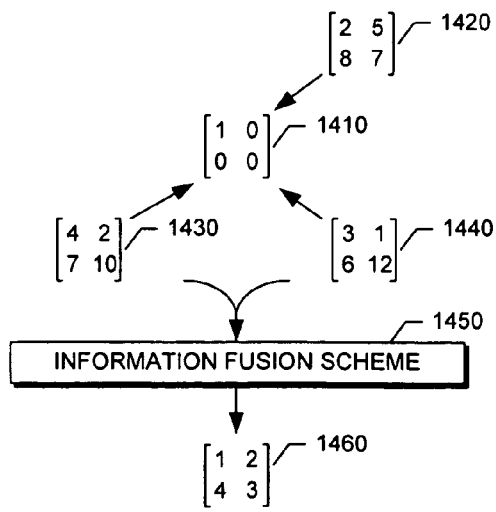
FIG. 14 is an exemplary illustration of the process of pixel value interpolation from scene images to up-sampled template image.

FIG. 14 is an exemplary illustration of the process of pixel value interpolation from scene images to up-sampled template image. After local patches from different images are matched and aligned, new information can be fused into the template image. This procedure is illustrated in FIG. 14. The 2×2 matrices 1410, 1420, 1430, 1440 shown in FIG. 14 represent the four input images to the iris pattern quality enhancement module 950 shown in FIG. 9. The central 2×2 matrix 1410 represents the up-sampled template image. The matching and alignment process shown in FIG. 13 is performed as described above. Now, there are three patches coming from three different scene images, all aligned with the same template patch. Locating the position where central 2×2 matrix 1410 is in the template patch, and retrieving the matrix values at corresponding position of each aligned patch, one will get three different matrices 1420, 1430, 1440. Because these three matrices 1420, 1430, 1440 are from patches that already aligned with template patch, one can assert that they contain information in the corresponding region in template image, which, in this case, is the central 2×2 matrix 1410. Therefore, if one would like to recover unknown information in up-sampled template patch 1410, one could fill the area of unknown (in this case, the places that are occupied by zeros (0's)) with the values from corresponding locations in scene patches.

The process of information filling from the three scene matrix to the template matrix can be done in many different ways. For example, direct pixel value interpolation is one way. This invention is not bound by any specific way of information fusion. That means, all kinds of possibility of information fusion is an option covered in this patent, as long as it creates a new image based on combination of information derived from scene and template images. In FIG. 14, the up-sampled template image 1410 and the scene images 1420, 1430, 1440 are input to the information fusion scheme 1450 process to produce the a resultant matrix 1460. By repeatedly doing the same thing for every location in up-sampled template image, the holes (places that have zero value) in up-sampled template will be filled up, and a new image with high quality is generated.

The last step for image quality enhancement is to down-sample the up-sampled template image. In this step, many different down-sample algorithms can be used, for examples, nearest-neighbor algorithm, bilinear interpolation or bi-cubic interpolation. After this step, the new image is down-sampled to the same size as input images, and also contains new information from all of the input images.

The invention can be used in all of the existed iris recognition systems, independent with what frame work the iris recognition system adopts, what segmentation algorithm the system is using, and what matching algorithm the system is using. As long as the iris recognition system can acquire more than one iris image, the invention can help to improve the quality of the input iris image, and therefore, improve the performance of iris recognition system.

The present invention is an algorithmic procedure that comprises taking input as a series of iris video images, finding internal information among each image, fusing the internal information in an intelligent way, and generating a new iris image that have much more detailed information about iris patterns than any of the input iris images. The format of input images includes all digital images format used in modern computer systems. The format can be, but not restricted to, BMP (Bitmapped image), EPS (encapsulated postscript), TIFF or TIF (Tagged Image File Format), JPEG or JPG (Join PhotoGraphic Experts Group), GIF (Graphics Interchange Format), RLE (Run-Length Encoding), MSP (Microsoft Paint), PCX, PCD (Photo CD) and pict. The number of the input images, can be any number greater than one. The algorithmic procedure comprises picking up template image, up-sampling the template image, breaking all input images into patches, matching and aligning patches between template and scene images, replacing the zeros in up-sample template image by fusing information from all the scene patches at corresponding location, and down-sampling the up-sampled image. The method for selecting of the template image, can have a number of variety. These variety includes, but not limited to, choosing randomly, choosing the template image according to the time stamps of input images, choosing the template image according to the position of the subject in the capture volume, performing frequency domain analysis, then choose the image that has the most abundant high frequency components, and applying multi-scale, multi-orientation two dimensional band-pass filters to extract features for all input images, then applying classifiers to separate the template image from scene images. The method for frequency domain analysis, can include, but not limited to two dimensional Fourier Analysis, three dimensional Analysis (2D image in addition to the sequential relation between images), and wavelet decomposition. The method for feature extraction, can include, but not limited to, using Gabor filters as signal basis to perform feature extraction, using 2D sine and cosine waves as signal basis to perform feature extraction, principal Component Analysis (PCA), two dimensional PCA, Fisher's Linear Discriminant Analysis (FLDA), two dimensional FLDA, independent Component Analysis (ICA), Non-Negative Matrix Factorization (NMF), and fractal geometry. The method for classification, can include, but not limited to, Nearest Neighbors (NN), Artificial Neural Network (ANN), Support Vector Machine (SVM), Decision Tree, Correlation Filter, and first perform sub-space projection, then followed by a classifier. The method for sub-space projection, can include, but not limited to using Gabor filters as signal basis to perform feature extraction, using 2D sine and cosine waves as signal basis to perform feature extraction, principal Component Analysis (PCA), two dimensional PCA, Fisher's Linear Discriminant Analysis (FLDA), two dimensional FLDA, independent Component Analysis (ICA), Non-Negative Matrix Factorization (NMF), and fractal geometry. The method for classifiers can include, but not limited to, Nearest Neighbors (NN), Artificial Neural Network (ANN), Support Vector Machine (SVM), Decision Tree, Correlation Filter, and first perform sub-space projection, then followed by a classifier. The method for matching and aligning patches, can include but not limited to, two dimensional correlation, two dimensional normalized correlation, correlation filters, any of the previous methods applied on phase-only information of the patches, and any of the previous methods applied on magnitude-only information of the patches. The method for information fusing from multiple scene images, can include but not limited to, replacing the old pixel values with pixel values from any scene image, letting new pixel value to be a linear combination of the pixel values from all scene images, and using non-linear optimization technique to tune the parameters for nonlinear combination of the pixel values from all scene images. The method for non-linear optimization, can include but not limited to, conjugate gradient method, simulated annealing, Nelder-Mead method, genetic algorithm, artificial neural network, Hidden Markov Model, and Probabilistic Graphical Model. The size of the images and the size of the patches, can be any positive integer number greater than 1. The apparatus for capturing iris images, can include but not limited to, digital cameras of any brand, digital camcorders of any brand, and traditional film cameras which has the ability to convert the images to a digital form. The procedure for iris acquisition, may or may not include the subject standing or sitting at a fixed place, may or may not ask subjects to place their chin against a fixed apparatus, and may or may not include the subject looking at a pre-defined location or point.

Although the disclosed exemplary embodiments describe a fully functioning method and system for uniquely identifying a subject based on an iris image of an eye of the subject, the reader should understand that other equivalent exemplary embodiments exist. Since numerous modifications and variations will occur to those reviewing this disclosure, the method and system for uniquely identifying a subject based on an iris image of an eye of the subject is not limited to the exact construction and operation illustrated and disclosed. Accordingly, this disclosure intends all suitable modifications and equivalents to fall within the scope of the claims.

We claim:
1. A method for uniquely identifying a subject based on an iris image of an eye of the subject, comprising:
   obtaining the iris image;
   applying at least one filter to the iris image to produce a filtered iris image, wherein said at least one filter enhances discriminative features of the iris image;
   applying at least one interpolation method to the filtered iris image to produce a resized iris image;
   applying at least one differencing process to the resized iris image to produce at least one local difference iris image; and
   applying at least one encoding process to said at least one local difference iris image to produce an iris code,
   wherein the iris code uniquely identifies the subject.
2. The method of claim 1, wherein the iris image is a segmented iris image, having a two-dimensional format, and that is sampled from an original iris image employing a mapping function.
3. The method of claim 1,
   wherein said at least one interpolation method interpolates an intensity value for pixels in the filtered iris image to downsample the filtered iris image,
   wherein said at least one differencing process compares an intensity value for pixels in the resized iris image, and
   wherein said at least one encoding process analyzes an intensity value for pixels in said at least one local difference iris image.
4. The method of claim 3, wherein said at least one differencing process compares the intensity value for pixels in the resized iris image that are adjacent neighbors.
5. The method of claim 3, wherein said at least one differencing process compares the intensity value for pixels in the resized iris image that are non-adjacent neighbors.
6. The method of claim 1, further comprising:
   creating an iris mask for the iris code that determines indices of the iris code that are valid for matching purposes;
   obtaining a second iris code and a second iris mask; and
   computing a matching score by comparing the iris code and the iris mask to the second iris code and the second iris mask.
7. The method of claim 6, wherein the computing of the matching score further comprises:
   creating a combined iris mask by combining the iris mask with the second iris mask;
   computing a number of valid bits in the combined iris mask;
   computing a number of bits that match in the iris code and the second iris code from only the indices denoted as valid in the combined iris mask; and
   computing the matching score by dividing the number of matched bits by the number of valid bits.
8. A system for using a computer to uniquely identify a subject based on an iris image of an eye of the subject, comprising:
   a memory device resident in the computer; and
   a processor disposed in communication with the memory device, the processor configured to:
      obtain the iris image;

apply at least one filter to the iris image to produce a filtered iris image, wherein said at least one filter enhances discriminative discriminate features of the iris image;

apply at least one interpolation method to the filtered iris image to produce a resized iris image;

apply at least one differencing process to the resized iris image to produce at least one local difference iris image; and apply at least one encoding process to said at least one local difference iris image to produce an iris code, wherein the iris code uniquely identifies the subject.

9. The system of claim 8, wherein the iris image is a segmented iris image, having a two-dimensional format, and that is sampled from an original iris image employing a mapping function.

10. The system of claim 8,
wherein said at least one interpolation method interpolates an intensity value for pixels in the filtered iris image to downsample the filtered iris image, wherein said at least one differencing process compares an intensity value for pixels in the resized iris image, and wherein said at least one encoding process analyzes an intensity value for pixels in said at least one local difference iris image.

11. The system of claim 10, wherein said at least one differencing process compares the intensity value for pixels in the resized iris image that are adjacent neighbors.

12. The system of claim 10, wherein said at least one differencing process compares the intensity value for pixels in the resized iris image that are non-adjacent neighbors.

13. The system of claim 8, wherein the processor further configured to:

create an iris mask for the iris code that determines indices of the iris code that are valid for matching purposes;

obtain a second iris code and a second iris mask; and compute a matching score by comparing the iris code and the iris mask to the second iris code and the second iris mask.

14. The system of claim 13, wherein to compute the matching score, the processor is further configured to:

create a combined iris mask by combining the iris mask with the second iris mask;

compute a number of valid bits in the combined iris mask;

compute a number of bits that match in the iris code and the second iris code from only the indices denoted as valid in the combined iris mask; and compute the matching score by dividing the number of matched bits by the number of valid bits.

\* \* \* \* \*